Jan. 10, 1961 R. S. HOWE, JR 2,967,743
ANTI-WRAP BEARING SEAL
Filed Jan. 3, 1957
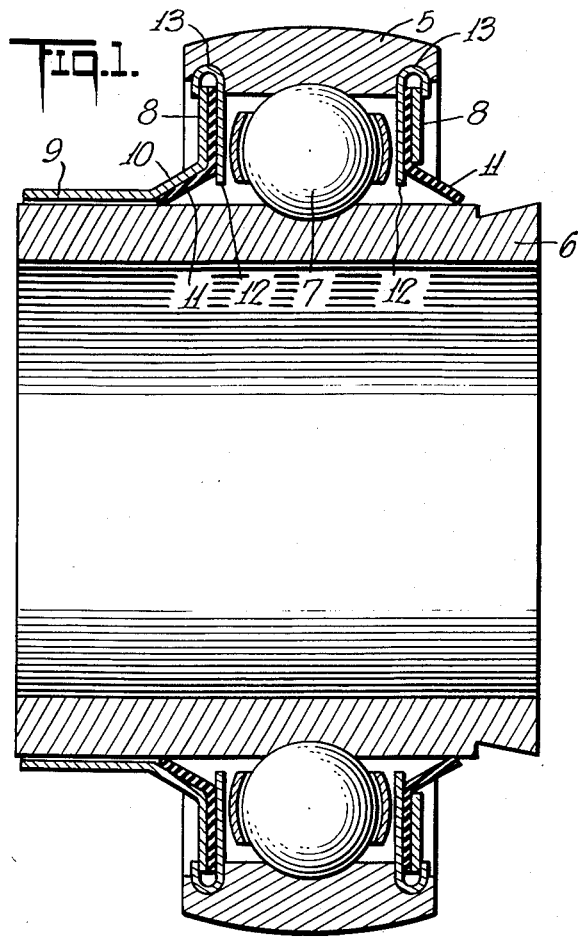
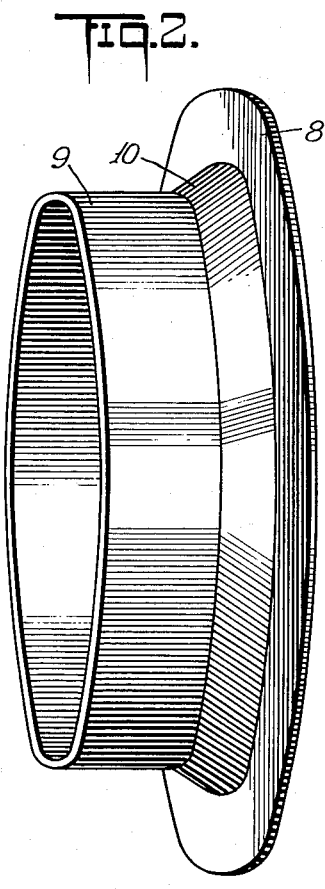
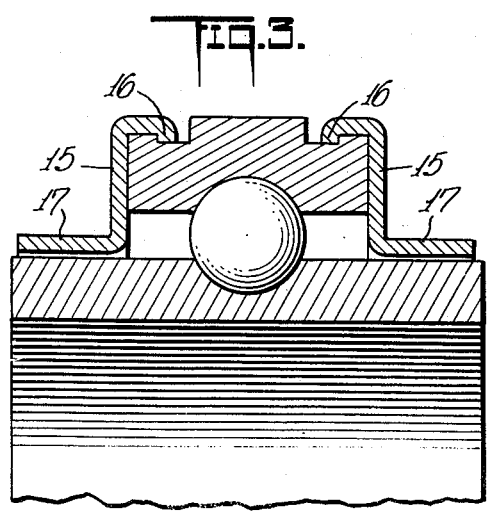
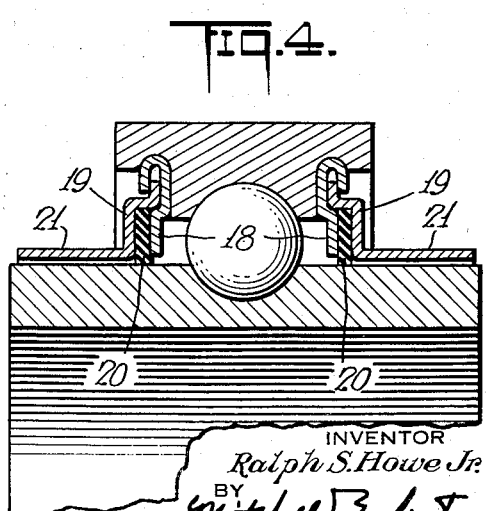
INVENTOR
Ralph S. Howe Jr.
BY
ATTORNEYS

United States Patent Office 2,967,743
Patented Jan. 10, 1961

2,967,743
ANTI-WRAP BEARING SEAL

Ralph S. Howe, Jr., New Britain, Conn., assignor to The Fafnir Bearing Company, New Britain, Conn., a corporation of Connecticut Filed Jan. 3, 1957, Ser. No. 632,292

1 Claim. (Cl. 308—187.1)

My invention relates to an anti-warp device for a bearing, particularly an anti-friction bearing including inner and outer bearing rings with interposed anti-friction bearing members.

Anti-friction bearings are extensively used on agricultural machinery and other machines in the presence of long fibrous material, for example, vegetable fibers in the form of grass, straw, vines and the like. When fibrous material wraps up on the inner ring it is likely to form into a very hard ring which often loosens or damages the usual bearing seal and permits the loss of lubricant and the entry of foreign matter which will either ruin the bearing or at least impair its proper functioning.

It is an object of my invention, therefore, to provide an improved anti-wrap seal device for a bearing.

It is a more specific object to provide an anti-wrap device which comprises a relatively stationary portion surrounding the rotating part so as to avoid wrapping of fibrous material on the rotating part.

Another object is to provide an improved anti-wrap device for a bearing which will not only prevent wrapping of fibrous material about the rotary member of the bearing, but will also serve as a protection to a rubber, felt or other seal between the two bearing rings.

Other objects and various features of novelty and invention will be hereinafter pointed out or will become apparent to those skilled in the art.

Briefly stated, in a preferred form of the invention, I provide an anti-warp seal member which may include a plate or washer-like member to be secured to the outer ring of a bearing and be extended generally across the space between the rings. This plate member may or may not form part of another seal for the bearing, such as a rubber or felt seal. This anti-wrap seal member terminates in a long generally cylindrical sleeve portion extending over the long inner bearing ring and in close running clearance relation therewith, and in the preferred form, it extends to the end of the ring. This anti-wrap device may constitute the outer plate of a rubber or felt seal and there may be one or more inner plates or one or more rubber washers or felts constituting an oil and dirt seal for the bearing.

In the drawings, which show, for illustrative purposes only, preferred forms of the invention:

Fig. 1 is a diametral, longitudinal sectional view through an anti-friction bearing illustrative of the invention.

Fig. 2 is an isometric view of an anti-wrap seal member shown applied in Fig. 1.

Fig. 3 is a fragmentary sectional view similar to Fig. 1 illustrating a slight modification.

Fig. 4 is a fragmentary view similar to Fig. 3 but illustrating a further modification.

In said drawings, the bearing preferably consists of an outer bearing ring 5, an inner ring 6 with interposed anti-friction bearing members, such as balls 7. The outer ring may be of spherical outer form so as to be self-aligning, as shown in Fig. 1, or may be of cylindrical form, as shown in Figs. 3 and 4.

The anti-wrap seal part includes a plate portion 8 secured to the outer ring and which plate part extends generally across the space between the rings and terminates in a long cylindrical sleeve 9 which surrounds the inner ring 6 and has a close running clearance fit therewith. The parts may be variously formed, but as shown in Fig. 2, the plate portion 8 and the sleeve portion 9 are integral and are joined by a generally conical section 10, as will be clear. In the form shown in Fig. 1 there is an oil and dirt seal which may consist of a rubber-like washer 11 which is interposed between the plate portions 8 and a seal plate 12 which is crimped into the groove 13 in the outer ring and which holds the plate portion 8 of the anti-wrap device and the washer 11 all in place oi the outer ring. The seal washer 11 in the form shown extends at an angle to the inner ring and is generally supported by the conical portion 10 and forms an oil and dirt seal for the bearing. The sleeve portion 9 in the form shown extends substantially to the end of the ring 6 and in any event will constitute a relatively long sleeve which will, of course, be stationary so long as the outer ring is stationary and, therefore, no fibrous material will tend to wrap on this cylindrical portion 9. Since the cylindrical portion 9 extends preferably to the end of the ring, there will be no wrap on the inner ring. Of course, this same anti-wrap seal member can be placed at the opposite side of the bearing from that shown in Fig. 1. It is not always necessary since often only one side is exposed to any fibrous wrapping material, therefore the right-hand seal of Fig. 1 does not include the anti-wrap device just described.

In the form shown in Fig. 3 the anti-wrap device includes a plate or washer portion 15 which extends along the end of the outer ring and has a flanged edge 16 crimped into a groove in an outer surface in the outer ring so as to hold the same securely thereon. This plate 15 extends generally across a space between the rings and terminates in a cylindrical sleeve 17 which functions as heretofore described in connection with Fig. 1. In the form shown in Fig. 3 duplicate seals are shown at opposite sides of the bearing.

In the form shown in Fig. 4 the structure is very much like that shown in Fig. 1 except that the inner seal plate 18 is stepped and the anti-wrap seal plate 19 is also stepped so the rubber-like or other seal washer 20 is held between the two plates. The plate 18 is crimped in much the same way as the corresponding plate in Fig. 1. Here again the sleeve portion 21 extends along and surrounds the inner ring with a running clearance and preferably extends about to the end of the ring. In Fig. 4 duplicate seals are shown at opposite sides of the bearing. Thus in Fig. 4 the two plates hold the seal washer 20 securely between them, and this washer rubs directly on the inner ring. This washer, of course, can be a felt washer as can also the washer 11.

Since the anti-wrap device forms a fixed part of the bearing the close running clearance between the inner ring and anti-wrap cylindrical portion may be held to close tolerances since the clearance may be governed by the close tolerances within the bearing itself.

This anti-wrap seal, in addition to its normal use of preventing wrapping, is also a good dirt seal due to the long clearance passage about the inner ring. This anti-wrap seal part also protects the normal contact or other seal against mechanical injury. The compactness and economy of manufacture and application of the anti-wrap device are important features.

In all forms described, it will be clear that any fibrous material would not have any tendency to wrap because the sleeve portion of the anti-wrap seal in each case is stationary so long as the outer ring is stationary, and therefore no matter how fast the inner ring rotates, there will be little likelihood of any wrapping of fibrous material about the ring.

While the invention has been described in considerable detail and preferred forms illustrated, it is to be understood that various changes may be made within the scope of the invention as defined in the appended claim.

I claim:

A seal for an antifriction bearing comprising an outer bearing ring of predetermined width, an inner bearing ring of a width substantially wider than said outer bearing ring and adapted to fit over a shaft, antifriction bearing elements interposed between said outer and said inner bearing rings, a substantially cylindrical surface member adapted to fit closely about said wider inner bearing ring, an outwardly flared portion formed integrally at one end of said cylindrical surface, a first rigid seal ring portion formed integrally around its inner edge with said outwardly flared portion and extending generally across the radial space between said bearing rings, said first seal ring portion being secured around its outer edge to said outer bearing ring, an annular ring of yieldable rubberlike material positioned against said first seal ring portion on the side thereof adjacent said antifriction bearing elements, the innermost edge of said annular ring of yieldable rubberlike material being bent out to be against the innermost surface of said outwardly flared portion and to terminate in contact with said inner bearing ring, a second rigid seal ring positioned against the opposite side of said annular ring of yieldable rubberlike material from said first seal ring portion, the innermost edge of said second seal ring terminating approximately in axial alignment with the junction between said first seal ring portion and said outwardly flared portion, and the outermost edge of said second seal ring being curved outwardly and downwardly to grip the outermost edges of both said first seal ring portion and said annular ring of yieldable rubber-like material.

References Cited in the file of this patent

UNITED STATES PATENTS

| | | |
|---|---|---|
| 1,808,798 | Urschel | June 9, 1931 |
| 1,888,215 | Bott | Nov. 22, 1932 |
| 1,917,988 | Large | July 11, 1933 |
| 1,930,586 | Delaval-Crow | Oct. 17, 1933 |
| 2,054,582 | Delaval-Crow | Sept. 15, 1936 |
| 2,114,954 | Brodin | Apr. 19, 1938 |
| 2,643,164 | Mass | June 23, 1953 |

FOREIGN PATENTS

| | | |
|---|---|---|
| 526,125 | Great Britain | Sept. 11, 1940 |
| 514,842 | Canada | July 19, 1955 |